(12) United States Patent
Hudson et al.

(10) Patent No.: US 11,748,113 B2
(45) Date of Patent: *Sep. 5, 2023

(54) OPERATING SYSTEM INSTALLATION MECHANISM

(71) Applicant: Hewlett Packard Enterprise Development LP, Houston, TX (US)

(72) Inventors: Charles L. Hudson, Austin, TX (US); Daniel Nathan Cripe, Austin, TX (US); Mike Chuang, Austin, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,592

(22) Filed: Jun. 29, 2022

(65) Prior Publication Data

US 2022/0326960 A1    Oct. 13, 2022

Related U.S. Application Data

(63) Continuation of application No. 16/885,381, filed on May 28, 2020, now Pat. No. 11,397,588.

(51) Int. Cl.
   *G06F 9/4401* (2018.01)
   *G06F 8/61* (2018.01)
   *G06F 21/57* (2013.01)
   *G06F 1/26* (2006.01)
   *H04L 9/40* (2022.01)

(52) U.S. Cl.
   CPC .............. *G06F 9/441* (2013.01); *G06F 1/26* (2013.01); *G06F 8/63* (2013.01); *G06F 9/4416* (2013.01); *G06F 21/572* (2013.01); *H04L 63/166* (2013.01); *G06F 8/61* (2013.01); *G06F 9/4401* (2013.01); *G06F 2221/033* (2013.01)

(58) Field of Classification Search
   CPC ... G06F 9/441; G06F 1/26; G06F 8/63; G06F 9/4416; G06F 21/572; G06F 2221/033; G06F 8/61; G06F 9/4401; H04L 63/166
   USPC .............................. 713/2; 717/174, 176, 178
   See application file for complete search history.

(56) References Cited

U.S. PATENT DOCUMENTS

| | | | |
|---|---|---|---|
| 7,802,084 B2 | 9/2010 | Fitzgerald et al. | |
| 9,268,550 B2 | 2/2016 | Stolberg et al. | |

(Continued)

FOREIGN PATENT DOCUMENTS

| | | |
|---|---|---|
| CN | 101166116 A | 4/2008 |
| CN | 103843006 A | 6/2014 |
| CN | 108604270 A | 9/2018 |

OTHER PUBLICATIONS

MAAS IO, "MAAS—how It Works," 2020, pp. 1-3, Canonical Ltd., Retrieved from the internet on Jan. 21, 2020 at URL <maas.io/how-it-works>.

(Continued)

*Primary Examiner* — Ji H Bae
(74) *Attorney, Agent, or Firm* — Slater Matsil, LLP (57) ABSTRACT

A system to facilitate operating system (OS) installation is described. The system includes a server and rack controller, including one or more processors to generate an imaging service comprising an OS image container, transmit data via a first network to initiate a boot up process at a server and download an OS image included in the OS image container via a second network, wherein the second network is separate from the first network.

21 Claims, 5 Drawing Sheets

(56) References Cited

U.S. PATENT DOCUMENTS

| | | |
|---|---|---|
| 9,385,918 B2 | 7/2016 | Civilini et al. |
| 10,425,229 B2 | 9/2019 | Mueller et al. |
| 10,467,019 B2 | 11/2019 | York |
| 11,397,588 B2* | 7/2022 | Hudson .................. G06F 9/4416 |
| 2005/0223210 A1* | 10/2005 | Sasaki ........................ G06F 8/63 |
| | | 713/1 |
| 2006/0242400 A1 | 10/2006 | Anderson et al. |
| 2006/0294515 A1 | 12/2006 | Gimpl et al. |
| 2008/0028052 A1 | 1/2008 | Currid et al. |
| 2014/0317394 A1 | 10/2014 | Buhler et al. |
| 2017/0237560 A1 | 8/2017 | Mueller et al. |
| 2017/0336841 A1 | 11/2017 | Ragupathi et al. |
| 2019/0007369 A1 | 1/2019 | Nirwal et al. |
| 2020/0110617 A1 | 4/2020 | Chaganti et al. |

OTHER PUBLICATIONS

Openstack, "Bare Metal Service User Guide", <https://docs.openstack.org/ironic/ussuri/user/index.html#top>, Jul. 2018, p. 10.

Packet, "Tinkerbell", <https://web.archive.org/web/20200514162028/https://tinkerbell.org/>, May 14, 2020, pp. 2.

Tinkerbell.org, "Components", <https://web.archive.org/web/20200527132742/https://tinkerbell.org/components/>, May 27, 2020, pp. 3.

MAAS IO, "MAAS—how It Works", Canonical Ltd, available online at <maas.io/how-it-works>, 2020, 3 pages.

\* cited by examiner

OPERATING SYSTEM INSTALLATION MECHANISM

BACKGROUND

An operating system (OS) image comprises a file or set of files that contain OS executable code, and data files that are to be deployed to one or more computing systems, such as servers. Deployment of an OS image to servers within a data center is typically performed by an imaging service that provisions the servers with compatible OS images.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Data centers typically employ image services to provision computing resources (e.g., servers) with OS images. Typically, the image services are provided by a computing device coupled to the data center servers via a multi-drop network. Thus, each server receives an OS image via the same network. Such an install environment is insecure since each deployed OS image is accessible by each device coupled to the network.

In embodiments, an OS image environment is provided. In such embodiments, a one-time image service is generated to provision a particular server with an OS image via a one-to one secure network connection. In further embodiments, an image service comprises an OS imaging service container. In yet further embodiments, the image service is generated in response to receiving a request to provision a server with a selected OS image. Subsequently, the server accesses and downloads the contents of the OS imaging service container. In still a further embodiment, the image service is removed (or deleted) once the server has been provisioned.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
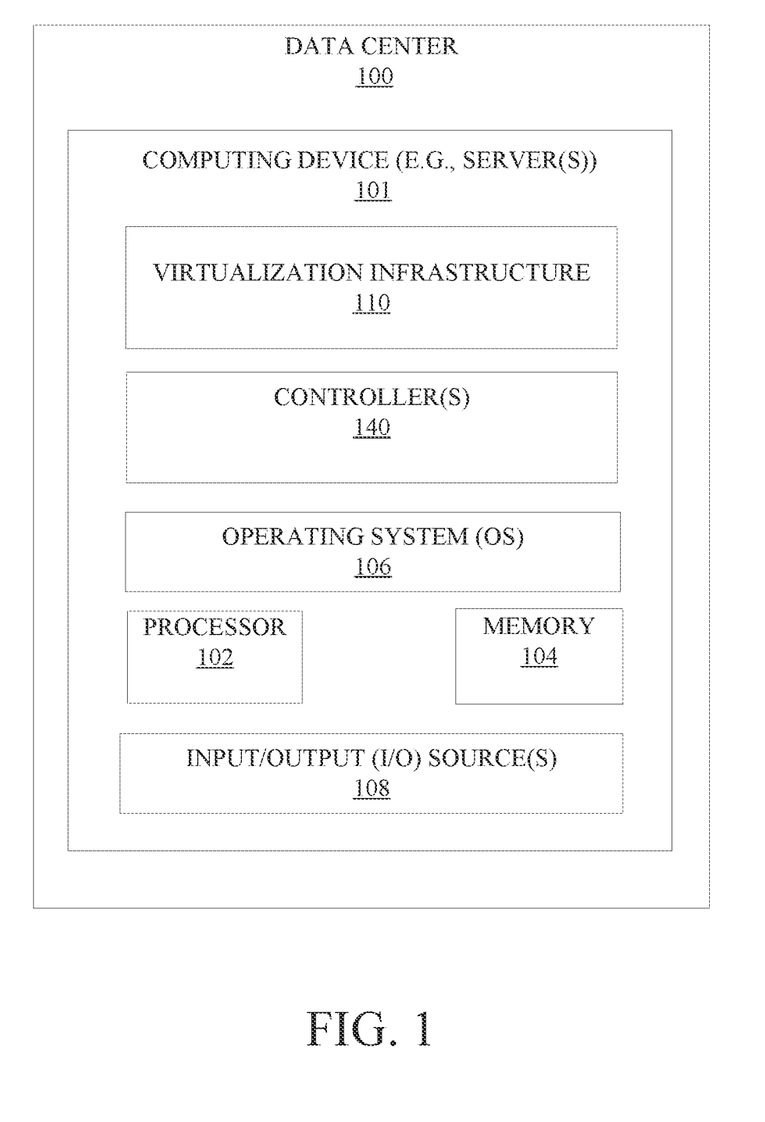
FIG. 1 illustrates one embodiment of a data center.

FIG. 1 illustrates one embodiment of a data center 100. As shown in FIG. 1, data center 100 includes one or more computing devices 101 that may be server computers serving as a host for data center 100. In embodiments, computing device 101 may include (without limitation) server computers (e.g., cloud server computers, etc.), desktop computers, cluster-based computers, set-top boxes (e.g., Internet-based cable television set-top boxes, etc.), etc. Computing device 101 includes an operating system ("OS") 106 serving as an interface between one or more hardware/physical resources of computing device 101 and one or more client devices, not shown. Computing device 101 further includes processor(s) 102, memory 104, input/output ("I/O") sources 108, such as touchscreens, touch panels, touch pads, virtual or regular keyboards, virtual or regular mice, etc.

In one embodiment, computing device 101 includes a server computer that may be further in communication with one or more databases or storage repositories, which may be located locally or remotely over one or more networks (e.g., cloud network, Internet, proximity network, intranet, Internet of Things ("IoT"), Cloud of Things ("CoT"), etc.). Computing device 101 may be in communication with any number and type of other computing devices via one or more networks.

According to one embodiment, computing device 101 implements a virtualization infrastructure 110 to provide virtualization of a plurality of host resources (or virtualization hosts) included within data center 100. In one embodiment, virtualization infrastructure 110 is implemented via a virtualized data center platform (including, e.g., a hypervisor), such as VMware vSphere or Linux Kernel-based Virtual Machine. However other embodiments may implement different types of virtualized data center platforms. Computing device 101 also facilitates operation of a network switching fabric. In one embodiment, the network switching fabric is a software-defined transport fabric that provides connectivity between the host resources within virtualization infrastructure 110.

According to one embodiment, the network switching fabric comprises physical infrastructure devices included a plurality of racks. Typically, a rack includes a metal frame to provide standardized structure to mount various rack devices, for example, servers, modems, storage systems, routers, and other equipment, such as power, cooling, and cable management resources, among others. Rack servers typically need to be provisioned with an OS prior to initiation. Accordingly, one or more controllers 140 are provided to provision OS images to rack servers within data center 100.

In one embodiment, a controller 140 generates a separate imaging service to provision a server. In such an embodiment, the imaging service comprises a container including an OS image (or OS image container). A defined herein, an OS image container comprises a standard unit of software that packages an OS image and all dependencies to enable an OS to operate from one computing environment to another. In a further embodiment, the imaging service (or imaging service container) is an isolated install environment implemented to provision a single server with an OS. Thus, the imaging service container provides a one-to one environment that enables transmission of container contents directly to a server via an isolated (e.g., secure) network connection.

Figure 2:
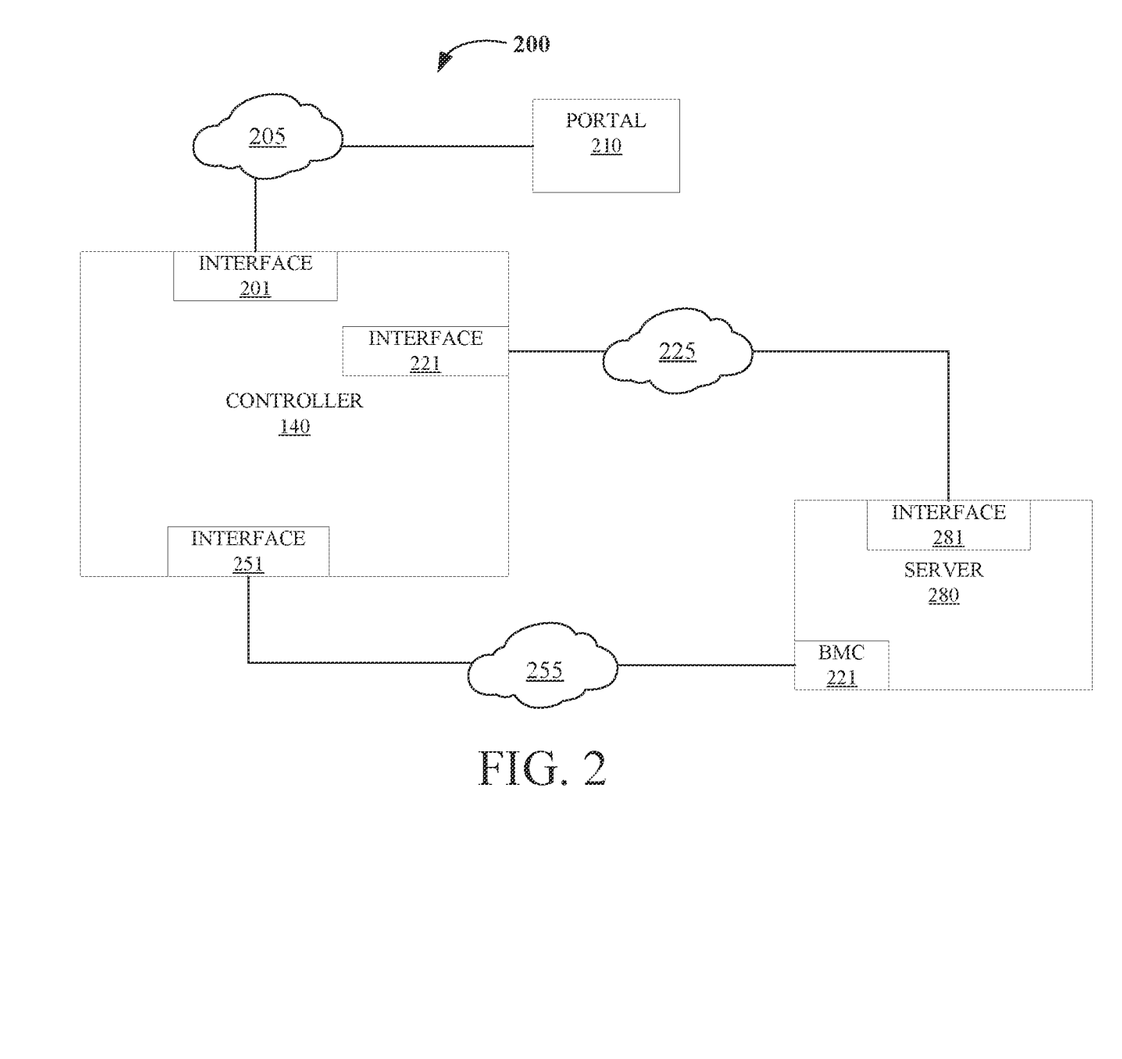
FIG. 2 is a block diagram illustrating one embodiment of an OS image install environment.

FIG. 2 is a block diagram illustrating one embodiment of an OS image install environment 200. As shown in FIG. 2, environment 200 includes controller 140 coupled to a portal 210 via a network 205 and a server 280 via networks 225 and 255. According to one embodiment, controller 140 includes an interface 201 to facilitate coupling to portal 210 via network 205, where network 205 may comprise the Internet. In such an embodiment, portal 210 is implemented to generate and transmit OS image containers to controller 140 via network 205 and interface 201. In a further embodiment, portal 210 may transmit OS images to controller 140, where the OS image containers may be subsequently generated. In one embodiment, an operator at portal 210 may register the OS image containers with image controller 140.

In a further embodiment, controller 140 and server 280 are included in the same rack. In such an embodiment, controller 140 comprises a rack controller that manages the various devices in the rack, including server 280. Thus, controller 140 may implement existing interfaces with server 280 without having to provide additional resources.

Figure 3:
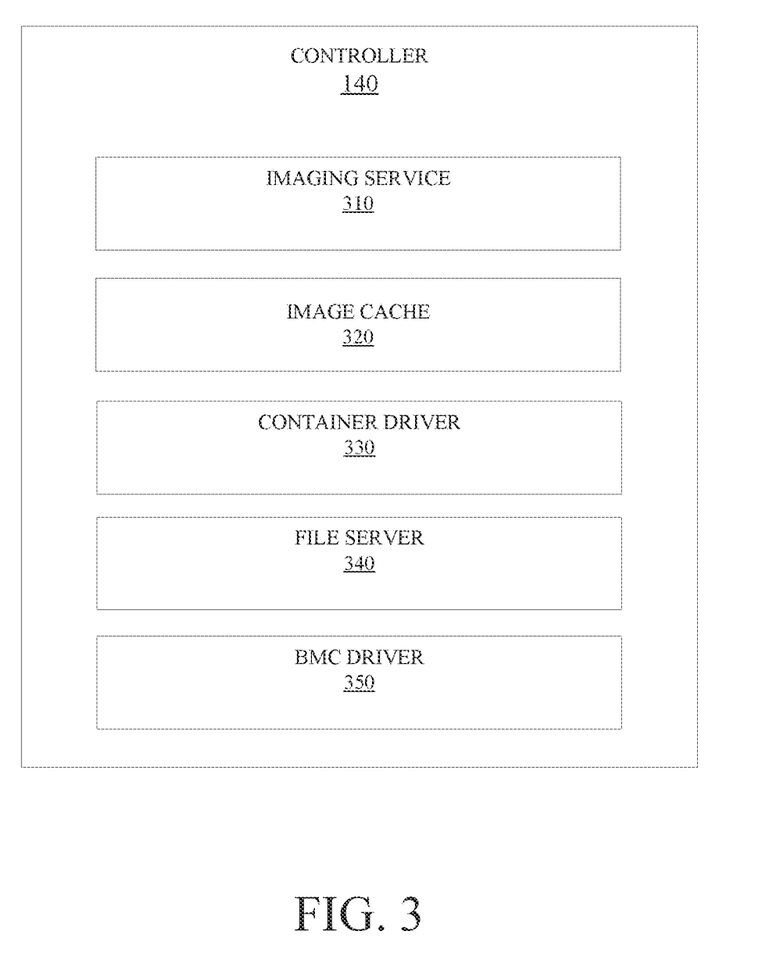
FIG. 3 is a block diagram illustrating one embodiment of a controller.

FIG. 3 illustrates one embodiment of controller 140 including an imaging service 310, image cache 320 and container driver 330. As mentioned above, imaging service 310 comprises a container that is used to provision an OS image (e.g., create an instance of an OS) at server 280. Image cache 320 is implemented to store registered OS image containers that may be selected to be implemented in imaging service 310. According to one embodiment, container driver 330 is implemented to generate an image service 310. In such an embodiment, container driver 330 generates an imaging service 310 by selecting an OS image container and setting up the OS image containers as an imaging service 310 to provision a server 280. In a further embodiment, container driver 330 implements OS level virtualization to set up the imaging service 310. In some embodiments, container driver 330 may be implemented via Docker software. However in other embodiments, container driver 330 may be implemented using different virtualization software products (e.g., a virtual machine, Kubernetes, etc.).

In one embodiment, imaging service 310 includes all software, configuration files, libraries and metadata needed to provision an OS image at server 280. In this embodiment, the metadata may comprise information including image file size, file signatures, OS version, how the OS is to be used, types of servers on which the OS operates, etc. In a further embodiment, the metadata may indicate one or more server types with which a particular OS image may be compatible. Thus, the metadata is used to determine which OS image may be applied to which server. Additionally, container driver 330 performs an integrity verification on a selected OS image container prior to setting up the container as imaging service 310. For example, a checksum or hashing operation is performed on the contents of the OS image container to verify that the container has not been tampered with.

Referring back to FIG. 2, controller 140 is also coupled to server 280 via a second network 225. In one embodiment, controller 140 includes an interface 221 coupled to network 225. Referring back to FIG. 3, controller 140 includes a file server 340 implemented to transmit the contents of imaging service 310 (e.g., OS image, configuration files, metadata, etc.) to server 280 via network 225 for provisioning the include OS at server 280. According to one embodiment, server 280 also includes an interface 281 (e.g., network interface card (NIC)) coupled to network 225 to receive imaging service 310 contents from file server 340. In one embodiment, server 280 establishes a secure link (e.g., a virtual local area network (VLAN) over network 225 to transfer data from imaging service 310. Thus, network 225 comprises an isolated network between controller and server 280.

Referring again to FIG. 2, controller 140 further comprises an interface 251 coupled to a baseboard management controller (BMC) 221 at server 280 via a third network 255 (e.g., a management network). BMC 221 comprises a management interface that enables configuration of boot mode at server 280, as well as and powering on/off and booting of server by controller 140 via network 255. According to one embodiment, network interfaces 201, 221 and 251 may implemented via hardware (e.g., NIC) or via software.

Referring back to FIG. 3, controller 140 includes a BMC driver 350 to initiate a boot up process (e.g., e.g., via a Preboot eXecution Environment (PXE), such as Unified Extensible Firmware Interface (UEFI) standard) at server 280 via network 255. Additionally, BMC driver 350 is implemented to power on server 280 via network 255. As a result, BMC 221 is configured to perform power on and boot operations initiated by BMC driver 350.

According to one embodiment, controller 140 facilitates the provisioning of an OS image by generating an imaging service 310 instance (or imaging service container) specifically to provision server 280. In such an embodiment, container driver 330 generates the imaging service container in response to a selection of an OS image compatible with the server 280 that is to be provisioned. Subsequently, BMC driver 350 sets up a server 280 boot using a transmission (e.g., via a PXE/UEFI boot HyperText Transfer Protocol (HTTP)) to BMC 221 via network 255.

In one embodiment, the transmission includes information identifying the imaging service container (e.g., a unique identifier), as well as Transport Layer Security (TLS) certificates to be used to establish a secure communication link. Additionally, the transmission includes an installer service kernel (or installer). After the HTTP transmission, BMC driver 350 powers on server 280 using BMC 221.

Figure 4:
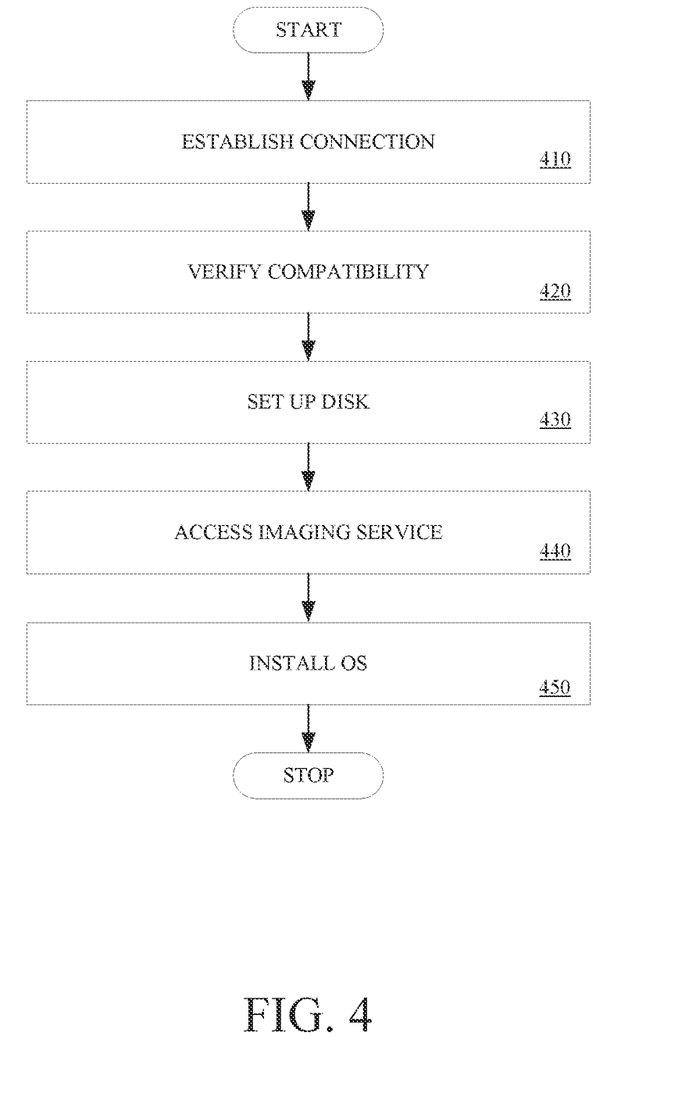
FIG. 4 is a flow diagram illustrating one embodiment of a provisioning process.

Once powered, server 280 executes the installer to initiate OS provisioning and installation. FIG. 4 is a flow diagram illustrating one embodiment of a provisioning process performed by the installer. At processing block 410, a secure communication link (e.g., VLAN) is established with file server 340 using the received TLS certificates. At processing block 420, the hardware compatibility of server 280 is verified against the OS image included in the imaging service container. In one embodiment, the verification is performed using the container metadata.

At processing block 430, the server 280 disk drive is set up for boot. In one embodiment, the server disk set up includes creating disk volumes and installing a boot loader package (e.g., GNU Gland Unified Bootloader (GRUB)). At processing block 440, the imaging service container is accessed via the secure communication link. At processing block 450, the OS is installed at server 280. In one embodiment, the OS is installed by downloading the contents (e.g., OS image, configuration file, etc.) from the imaging service container and writing to the disk drive.

Figure 5:
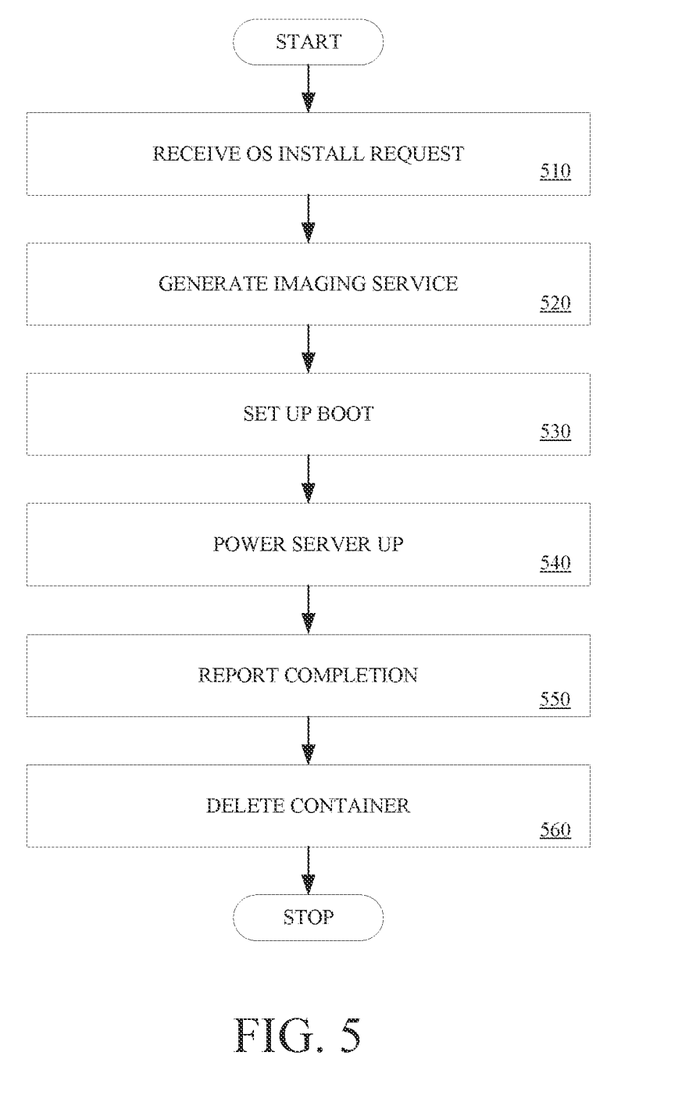
FIG. 5 is a flow diagram illustrating one embodiment of a method performed by a controller.

FIG. 5 is a flow diagram illustrating one embodiment of a method performed by controller 140. At processing block 510, a request for an OS install at a server is received. At processing block 520, an imaging service container is generated. As discussed above, the imaging service container may comprise an OS image container selected from a plurality of stored OS image containers compatible with the server. At processing block 530, a boot is set at the server by transmitting data via a BMC network. As discussed above the transmitted data includes an identifier for the imaging service container and TLS credentials. At processing block 540, the server is powered up. Subsequently, the server accesses the imaging service container via a secure VLAN and downloads the contents of the imaging service container for provisioning. At processing block 550, the imaging service reports that the downloading of the container contents has been completed. At processing block 560, the imaging service container is deleted from the install environment.

The above-described install environment enables the provisioning of servers via secure, one to one communication with imaging service containers. Thus, multiple servers may be simultaneously provisioned via different imaging service containers on separate communication links. For example, each server within a rack may be simultaneously provisioned via separate, isolated VLANs between the controller and a server.

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system to facilitate operating system (OS) installation, comprising:
   a server; and
   a rack controller, including:
      one or more processors to select an OS image container, transmit data to the server via a first network to initiate a boot up process at the server, establish a secure communication link with the server over a second network, and download an OS image included in the OS image container to the server via the secure communication link, wherein the second network is separate from the first network.

2. The system of claim 1, wherein the one or more processors report that the OS image has been downloaded to the server.

3. The system of claim 2, wherein the OS image container is part of an imaging service container, and the one or more processors delete the imaging service container once the OS image has been downloaded to the server.

4. The system of claim 1, wherein the one or more processors select the OS image container by selecting a first of a plurality of OS image containers associated with the server.

5. The system of claim 1, wherein the server comprises a baseboard management controller (BMC) to initiate the boot up process at the server.

6. The system of claim 1, wherein the OS image container comprises metadata including information regarding the OS image container.

7. The system of claim 6, wherein the server installs the OS.

8. The system of claim 1, wherein the data transmitted to the server via the first network comprises Transport Layer Security (TLS) certificates to be used to establish the secure communication link.

9. The system of claim 2, wherein the server installs the OS by analyzing the metadata to verify that the OS image container is compatible with the server.

10. The system of claim 1, wherein the server comprises a BMC that initiates a power up process at the server via the first network prior to initiating the boot up process.

11. The system of claim 4, wherein the one or more processors receive the plurality of OS image containers via a third network.

12. The system of claim 1, wherein the first network comprises a BMC network and the second network comprises a virtual local area network (VLAN).

13. A method to facilitate compute node configuration, comprising:
   selecting an OS image container;

transmitting data to a server via a first network to initiate a boot up process at the server;

establishing a secure communication link with the server over a second network; and downloading an OS image included in the OS image container to the server via the secure communication link, wherein the second network is separate from the first network.

14. The method of claim 13, wherein the OS image container is part of an imaging service container, the method further comprising:

reporting that the OS image has been downloaded to the server; and deleting the imaging service container once the OS image has been downloaded to the server.

15. The method of claim 13, wherein selecting the OS image container comprises selecting a first of a plurality of OS image containers associated with the server.

16. The method of claim 13, wherein the OS image container comprises metadata including information regarding the OS image container.

17. The method of claim 13, wherein the data transmitted to the server via the first network comprises Transport Layer Security (TLS) certificates to be used to establish the secure communication link.

18. A non-transitory machine-readable medium storing instructions which, when executed by a processor, cause the processor to:

select an OS image container;

transmit data to a server via a first network to initiate a boot up process at the server;

establish a secure communication link with the server over a second network; and download an OS image included in the OS image container to the server via the secure communication link, wherein the second network is separate from the first network.

19. The non-transitory machine-readable medium of claim 18, wherein the OS image container is part of an imaging service container, the non-transitory machine-readable medium further storing instructions which, when executed by the processor, further cause the processor to:

report that the OS image has been downloaded to the server; and delete the imaging service container once the OS image has been downloaded to the server.

20. The non-transitory machine-readable medium of claim 18, wherein the instructions to select the OS image container comprise instructions to select a first of a plurality of OS image containers associated with the server.

21. The non-transitory machine-readable medium of claim 18, wherein the first network comprises a BMC network and the second network comprises a virtual local area network (VLAN).

* * * * *